(12) United States Patent
Lee et al.

(10) Patent No.: US 10,055,069 B2
(45) Date of Patent: Aug. 21, 2018

(54) IN-CELL TOUCH PANEL AND TRACE LAYOUT THEREOF

(71) Applicant: Raydium Semiconductor Corporation, Hsinchu (TW)

(72) Inventors: Kun-Pei Lee, Zhunan Township (TW); Yi-Ying Lin, Hualien (TW); Chang-Ching Chiang, Taichung (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 168 days.

(21) Appl. No.: 14/884,856

(22) Filed: Oct. 16, 2015

(65) Prior Publication Data

US 2016/0109980 A1    Apr. 21, 2016

Related U.S. Application Data

(60) Provisional application No. 62/162,238, filed on May 15, 2015, provisional application No. 62/157,251, filed on May 5, 2015, provisional application No. 62/065,317, filed on Oct. 17, 2014.

(51) Int. Cl.
*G06F 3/044* (2006.01)
*G02F 1/1333* (2006.01)
*G02F 1/1335* (2006.01)
*G02F 1/1368* (2006.01)
*G06F 3/041* (2006.01)

(52) U.S. Cl.
CPC ............ *G06F 3/044* (2013.01); *G02F 1/1368* (2013.01); *G02F 1/13338* (2013.01); *G02F 1/133512* (2013.01); *G02F 1/133514* (2013.01); *G06F 3/0412* (2013.01)

(58) Field of Classification Search
CPC ........... G02F 1/13338; G02F 1/133512; G02F 1/133514; G02F 1/1368; G06F 3/0412; G06F 3/044
See application file for complete search history.

(56) References Cited

U.S. PATENT DOCUMENTS

| | | | | |
|---|---|---|---|---|
| 2008/0117182 A1* | 5/2008 | Um | ........................ | G06F 3/0412 345/173 |
| 2008/0150901 A1* | 6/2008 | Lowles | ................ | G02F 1/13338 345/173 |
| 2009/0167703 A1* | 7/2009 | You | ..................... | G02F 1/13338 345/173 |
| 2010/0053115 A1* | 3/2010 | Kim | ........................ | G06F 3/045 345/174 |
| 2011/0250713 A1* | 10/2011 | Kawasaki | ............. | H01L 29/458 438/34 |

(Continued)

*Primary Examiner* — Viet Pham

(57) ABSTRACT

An in-cell touch panel and its trace layout are disclosed. The in-cell touch panel includes a plurality of pixels. Each pixel has a laminated structure bottom-up including a substrate, a TFT layer, a liquid crystal layer, a color filter layer, and a glass layer. The TFT layer is disposed on the substrate. A first conductive layer and a second conductive layer are integrated in the TFT layer. The liquid crystal layer is disposed on the TFT layer. The color filter layer is disposed on the liquid crystal layer. The glass layer is disposed on the color filter layer. The design of touch sensing electrodes and their trace layout in the in-cell touch panel of the application is simple and it can effectively reduce cost and reduce the RC loading of a common electrode.

14 Claims, 15 Drawing Sheets

(56) References Cited

U.S. PATENT DOCUMENTS

| | | | |
|---|---|---|---|
| 2013/0076996 A1* | 3/2013 | Misaki | G06F 3/0418 349/12 |
| 2014/0063393 A1* | 3/2014 | Zhong | G02F 1/13306 349/42 |
| 2014/0071360 A1* | 3/2014 | Chang | G06F 3/0412 349/12 |
| 2014/0077213 A1* | 3/2014 | Zhang | H01L 29/458 257/59 |
| 2014/0111476 A1* | 4/2014 | You | G09G 3/3655 345/174 |
| 2014/0118642 A1* | 5/2014 | Wang | G02F 1/13338 349/12 |
| 2014/0118666 A1* | 5/2014 | Lee | G02F 1/13394 349/106 |
| 2014/0293144 A1* | 10/2014 | Bae | G06F 3/041 349/12 |
| 2014/0362303 A1* | 12/2014 | Huang | G06F 3/041 349/12 |
| 2015/0062459 A1* | 3/2015 | Li | H01Q 1/44 349/12 |

\* cited by examiner

1

| |
|---|
| 18 |
| 17 |
| 16 |
| 15 |
| 14 |
| 13 |
| 12 |
| 11 |
| 10 |

| |
|---|
| 26 |
| 25 |
| 24 |
| 23 |
| 22 |
| 21 |
| 20 |

FIG. 2

IN-CELL TOUCH PANEL AND TRACE LAYOUT THEREOF

BACKGROUND OF THE INVENTION

Field of the Invention

This invention relates to a touch panel, especially to an in-cell touch panel and trace layout thereof.

Description of the Related Art

Please refer to FIG. 1. FIG. 1 illustrates a laminated structure of a conventional on-cell capacitive touch panel. As shown in FIG. 1, the laminated structure 1 of the conventional on-cell capacitive touch panel includes a substrate 10, a thin-film transistor layer 11, a liquid crystal layer 12, a color filtering layer 13, a glass layer 14, a touch sensing layer 15, a polarizer 16, an adhesive 17, and top lens 18.

From FIG. 1, it can be found that the touch sensing layer 15 of the on-cell capacitive touch panel is disposed above the glass layer 14; that is to say, the touch sensing layer 15 is disposed out of the liquid crystal display module of the on-cell capacitive touch panel. Compared to the conventional one glass solution (OGS), the on-cell capacitive touch panel can achieve thinner touch panel design; however, the on-cell capacitive touch panel cannot meet the thinnest thickness requirement of the novel portable electronic products such as mobile phones, tablet PCs, and notebooks.

Therefore, the invention provides an in-cell mutual-capacitive touch panel and trace layout thereof to solve the above-mentioned problems.

SUMMARY OF THE INVENTION

A preferred embodiment of the invention is an in-cell mutual-capacitive touch panel. In this embodiment, the in-cell mutual-capacitive touch panel includes a plurality of pixels. A laminated structure of each pixel includes a substrate, a thin-film transistor layer, a liquid crystal layer, a color filtering layer, and a glass layer. The thin-film transistor layer is disposed above the substrate. A first conductive layer and a second conductive layer are integrated in the thin-film transistor layer. The liquid crystal layer is disposed above the thin-film transistor layer. The color filtering layer is disposed above the liquid crystal layer. The glass layer is disposed above the color filtering layer.

In an embodiment, the second conductive layer and a common electrode are formed simultaneously, but the second conductive layer and the common electrode are separated, and the first conductive layer is formed after the common electrode.

In an embodiment, the first conductive layer is formed above the second conductive layer and the first conductive layer is electrically connected with the second conductive layer to form a bridge structure.

In an embodiment, the second conductive layer and a common electrode are formed simultaneously, but the second conductive layer and the common electrode are separated, and the first conductive layer is formed before the common electrode.

In an embodiment, the second conductive layer is formed above the first conductive layer and the second conductive layer is electrically connected with the first conductive layer to form a bridge structure.

In an embodiment, the second conductive layer is formed before a common electrode and the first conductive layer is formed after the common electrode, and the second conductive layer and a source electrode and a drain electrode of the thin-film transistor layer are formed simultaneously.

In an embodiment, the first conductive layer is formed above the second conductive layer and the first conductive layer is electrically connected with the second conductive layer to form a bridge structure.

In an embodiment, the second conductive layer is formed before the first conductive layer and the first conductive layer is formed before a common electrode, and the second conductive layer and a source electrode and a drain electrode of the thin-film transistor layer are formed simultaneously.

In an embodiment, the first conductive layer is formed above the second conductive layer and the first conductive layer is electrically connected with the second conductive layer to form a bridge structure.

In an embodiment, the second conductive layer is formed before a common electrode and the first conductive layer is formed after the common electrode, and the second conductive layer and a gate electrode of the thin-film transistor layer are formed simultaneously.

In an embodiment, the first conductive layer is formed above the second conductive layer and the first conductive layer is electrically connected with the second conductive layer to form a bridge structure.

In an embodiment, the gate electrode of the thin-film transistor layer is arranged adjacent to another gate electrode.

In an embodiment, the second conductive layer is formed before the first conductive layer and the first conductive layer is formed before a common electrode, and the second conductive layer and a gate electrode of the thin-film transistor layer are formed simultaneously.

In an embodiment, the first conductive layer is formed above the second conductive layer and the first conductive layer is electrically connected with the second conductive layer to form a bridge structure.

In an embodiment, the gate electrode of the thin-film transistor layer is arranged adjacent to another gate electrode.

In an embodiment, the in-cell touch panel is an in-cell mutual capacitive touch panel and a driving electrode (TX) and a sensing electrode (RX) of the in-cell mutual capacitive touch panel are formed by the first conductive layer in a mesh type.

In an embodiment, when the driving electrode (TX) and the sensing electrode (RX) formed by the first conductive layer cross each other, the second conductive layer is used as a bridge structure to electrically connect the driving electrode (TX) or electrically connect the sensing electrode (RX).

In an embodiment, the first conductive layer further includes a first connecting portion separated from the driving electrode (TX) and the sensing electrode (RX), and the first connecting portion is electrically connected with the common electrode.

In an embodiment, the second conductive layer further includes a second connecting portion electrically connected with the common electrode.

In an embodiment, the color filtering layer further includes a color filter and a black matrix resist and the black matrix resist has good light resistance, and the first conductive layer and the second conductive layer are disposed under the black matrix resist.

In an embodiment, when the in-cell touch panel is operated in a touch mode, a common electrode is switched to a floating voltage level or provided a touch-related signal.

In an embodiment, a touch mode and a display mode of the in-cell touch panel are driven in a time-sharing way, and the in-cell touch panel is operated in the touch mode during a blanking interval of a display period of the in-cell touch panel.

In an embodiment, the blanking interval includes at least one of a vertical blanking interval (VBI), a horizontal blanking interval (HBI), and a long horizontal blanking interval, the long horizontal blanking interval has a time length equal to or larger than that of the horizontal blanking interval, the long horizontal blanking interval is obtained by redistributing a plurality of the horizontal blanking interval or the long horizontal blanking interval includes the vertical blanking interval.

Compared to the prior arts, the in-cell mutual-capacitive touch panel and its trace layout of the invention have following advantages:
(1) Designs of the touch electrodes and their traces in the in-cell touch panel of the invention are very simple, and the cost of the in-cell touch panel of the invention can be reduced.
(2) Optical effects on the LCD touch panel can be reduced by the novel trace layout method of the invention, and the aperture ratio of the LCD touch panel can be enhanced.
(3) The RC loading of the common electrode can be reduced by electrically connecting the non-touch electrode part of the first conductive layer and the second conductive layer with the common electrode.

The advantage and spirit of the invention may be understood by the following detailed descriptions together with the appended drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 illustrates a schematic diagram of the laminated structure of the conventional on-cell capacitive touch panel.

FIG. 2 illustrates a schematic diagram of the laminated structure of the in-cell capacitive touch panel in a preferred embodiment of the invention.

DETAILED DESCRIPTION

Figure 3:
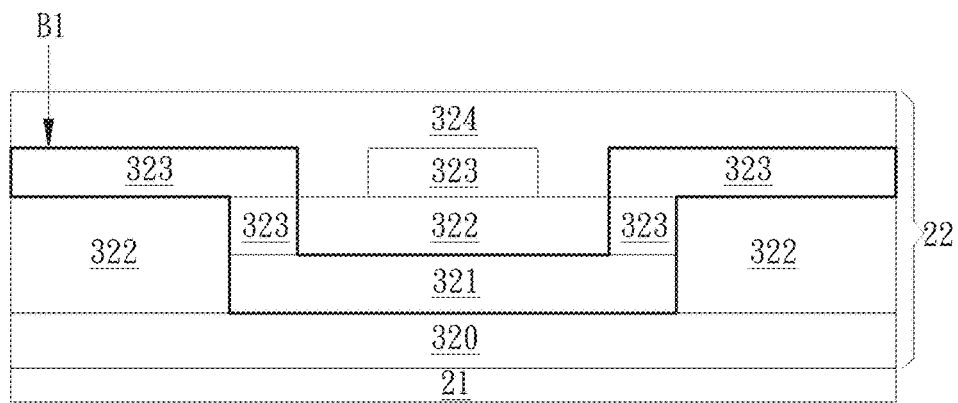
FIG. 3 illustrates an embodiment of the laminated structure of the touch component layer 22 of FIG. 2.

A preferred embodiment of the invention is an in-cell capacitive touch panel. In practical applications, the in-cell capacitive touch panel can achieve thinnest touch panel design; therefore, it can be widely used in portable electronic products such as mobile phones, tablet PCs, and notebooks.

In this embodiment, the in-cell mutual-capacitive touch panel can be suitable for displays using in-plane switching liquid crystal (IPS) technology, fringe field switching (FFS) technology, or advanced hyper-viewing angle (AHVA) technology, but not limited to these cases.

In general, the most popular capacitive touch sensing technology in nowadays should be the projected capacitive touch sensing technology including a mutual-capacitive type and a self-capacitive type. As to the mutual-capacitive touch sensing technology, when a touch occurs, capacitive coupling will be generated between two electrode layers adjacent to the touch point, and the capacitance change between the two electrode layers will be used to determine the touch point. As to the self-capacitive touch sensing technology, when a touch occurs, capacitive coupling will be generated between the touch item and the electrode, and the capacitance change of the electrode will be used to determine the touch point.

It should be noticed that the in-cell capacitive touch panel of this embodiment can use the mutual-capacitive touch sensing technology or the self-capacitive touch sensing technology. The touch electrodes of the in-cell capacitive touch panel can be distributed in a mesh type and different layouts can be formed by them based on practical needs, so that they can applied to mutual-capacitive touch sensing or self-capacitive touch sensing respectively.

In addition, the touch electrodes of this embodiment are disposed between the TFT component layer and liquid crystal layer, so that the touch electrodes can be integrated at the same side of the driving components (the TFT components). However, the touch electrodes of this embodiment are independent in structure without using any part of the TFT components. Therefore, the driving relationship between the touch electrodes and the TFT components can be simple, and the poor yield problem caused by the integration of the touch electrodes and the TFT components can be solved.

Then, the laminated structure of the in-cell capacitive touch panel of this embodiment will be introduced in detail as follows.

Please refer to FIG. 2. FIG. 2 illustrates a schematic diagram of the laminated structure of the in-cell capacitive touch panel of this embodiment. As shown in FIG. 2, in an embodiment, the laminated structure 2 of the in-cell capacitive touch panel includes a substrate 20, a thin-film transistor (TFT) layer 21, a touch component layer 22, a liquid crystal layer 23, a color filtering layer 24, a glass layer 25, and a polarizer layer 26. It should be noticed that the touch component layer 22 is disposed between the TFT layer 21 and the liquid crystal layer 23. The structure of the TFT layer 21 has no specific limitations and can be any designs. The semiconductor layer of the TFT layer 21 is formed by semiconductor material, such as low-temperature poly-silicon (LTPS), indium gallium zinc oxide (IGZO), or amorphous silicon (a-Si), but not limited to this.

In this embodiment, the color filtering layer 24 includes a color filter CF and a black matrix resist BM. The black matrix resist BM has good light resistance and it can be used in the color filtering layer 24 to separate three different color filters including a red (R) color filter, a green (G) color filter, and a blue (b) color filter. In addition, the black matrix resist BM can be also aligned with the touch electrodes of the touch component layer 22 to shield the touch electrodes of the touch component layer 22. Therefore, the touch electrodes of the touch component layer 22 can be formed by transparent conductive materials or opaque conductive materials without affecting the aperture ratio of the pixels of the in-cell capacitive touch panel.

Then, please refer to FIG. 3. FIG. 3 illustrates an embodiment of the laminated structure of the touch component layer 22 of FIG. 2. As shown in FIG. 3, at first, an insulating layer 320 is formed above the TFT layer 21; then, a conductive layer 321 is formed above the insulating layer 320; afterward, another insulating layer 322 is formed above the conductive layer 321; then, a via is formed in the insulating layer 322; afterward, another conductive layer 323 is formed in the via and above the insulating layer 322, so that the conductive layer 323 in the via can be electrically connected with the conductive layer 321 to form a bridge structure B1; at last, another insulating layer 324 is formed above the conductive layer 323. By doing so, the bridge structure B1 formed by both the conductive layers 321 and 323 can be used as a touch electrode (e.g., X-direction sensing electrode), and it can bypass another touch electrode (e.g., Y-direction sensing electrode) formed by the conductive layer 323 from below to bridge the touch electrodes.

Figure 4:
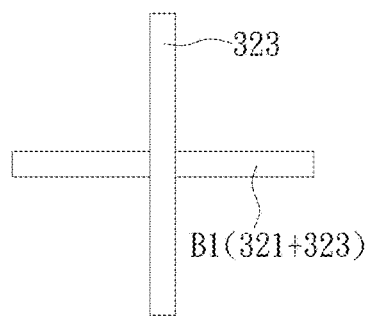
FIG. 4 illustrates a top-view of the bridge structure B1 and the touch electrode 323 of FIG. 3.

It should be noticed that the bridge structure B1 (e.g., X-direction sensing electrode) of this embodiment bypasses the conductive layer 323 (e.g., Y-direction sensing electrode) from below; therefore, the bridge structure B1 of this embodiment is closer to the side of the TFT layer 21. Please also refer to FIG. 4. FIG. 4 illustrates a top-view of the bridge structure B1 and the touch electrode 323 of FIG. 3. As shown in FIG. 4, it can be found that the bridge structure B1 bypasses the touch electrode (the conductive layer 323) from below.

In practical applications, the conductive layers 321 and 323 can be formed by the same conductive material or different conductive materials without specific limitations. Similarly, the insulating layers 320, 322, and 324 can be formed by the same organic or inorganic insulating material or different organic or inorganic insulating materials without specific limitations. In addition, since the bridge structure as X-direction sensing electrode is formed by both the conductive layers 321 and 323, it can be said that the sensing electrode of the same direction can be formed by different conductive layers.

Figure 5:
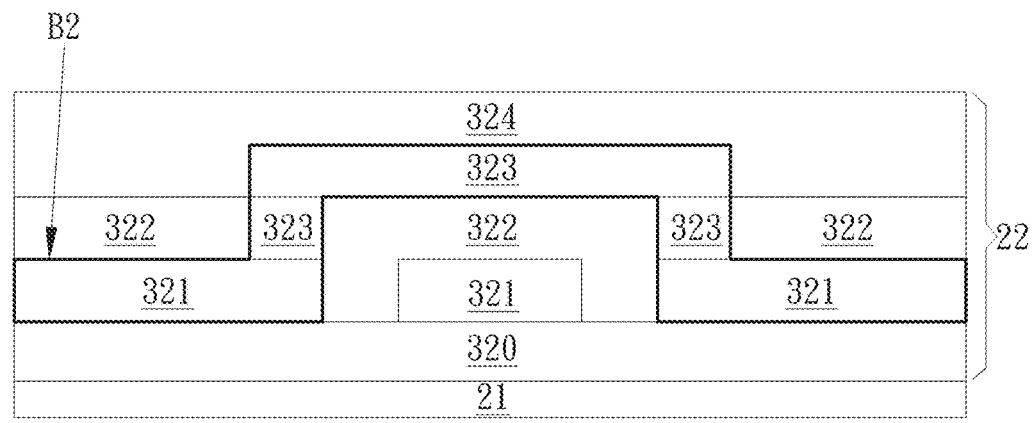
FIG. 5 illustrates another embodiment of the laminated structure of the touch component layer 22 of FIG. 2.

Then, please refer to FIG. 5. FIG. 5 illustrates another embodiment of the laminated structure of the touch component layer 22 of FIG. 2. As shown in FIG. 5, at first, an insulating layer 320 is formed above the TFT layer 21; then, several separated conductive layers 321 are formed above the insulating layer 320; afterward, another insulating layer 322 is formed above the conductive layer 321; then, a via is formed in the insulating layer 322; afterward, another conductive layer 323 is formed in the via and above the insulating layer 322, so that the conductive layer 323 in the via can be electrically connected with the conductive layer 321 to form a bridge structure B2. By doing so, the bridge structure B2 formed by both the conductive layers 321 and 323 can be used as a touch electrode (e.g., X-direction sensing electrode), and it can bypass another touch electrode (e.g., Y-direction sensing electrode) formed by the conductive layer 321 from top to bridge the touch electrodes.

Figure 6:
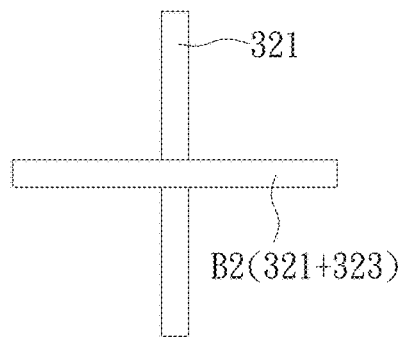
FIG. 6 illustrates a top-view of the bridge structure B2 and the touch electrode 321 of FIG. 5.

It should be noticed that the bridge structure B2 (e.g., X-direction sensing electrode) of this embodiment bypasses the conductive layer 321 (e.g., Y-direction sensing electrode) from top; therefore, the bridge structure B2 of this embodiment is closer to the side of the liquid crystal layer 33. Please also refer to FIG. 6. FIG. 6 illustrates a top-view of the bridge structure B2 and the touch electrode 321 of FIG. 5. As shown in FIG. 6, it can be found that the bridge structure B2 bypasses the touch electrode (the conductive layer 321) from top.

Next, the pattern design of the touch electrodes of the touch component layer 22 will be introduced as follows.

Figure 7:
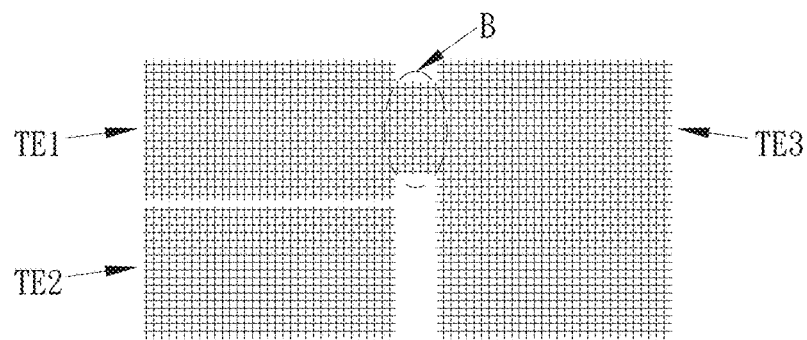
FIG. 7 illustrates a schematic diagram of the conductive layer patterned in a mesh type.

In this embodiment, the pattern of touch electrodes is designed in a mesh type, and the above-mentioned bridge structures B1 and B2 can bridge the touch electrodes at suitable positions and the conductive layers can be disconnected to form open circuits, so that the touch electrodes in the mesh type can be designed to be self-capacitive touch electrodes or mutual-capacitive touch electrodes based on practical needs. Please refer to FIG. 7. FIG. 7 illustrates the conductive layer having pattern in the mesh type. As shown in FIG. 7, the first electrode region TE1 and the second electrode region TE2 are separated from each other by disconnecting the conductive layer; the first electrode region TE1 and the third electrode region TE3 are electrically connected because the region B is not disconnected.

Figure 8:
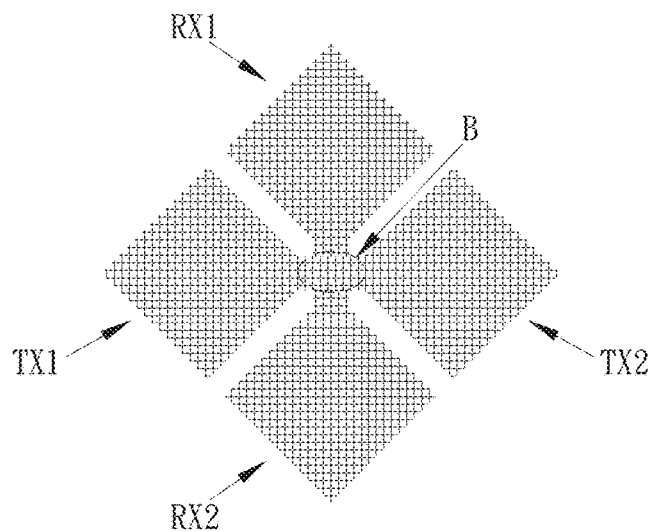
FIG. 8 illustrates a top-view of the bridge structure of the mutual-capacitive touch electrodes.

Please refer to FIG. 8. FIG. 8 illustrates a top-view of the bridge structure of the mutual-capacitive touch electrodes. As shown in FIG. 8, the first touch electrodes TX1 and TX2 are electrically connected by bypassing the second touch electrodes RX1 and RX2 from top through the bridge structure B.

Figure 9:
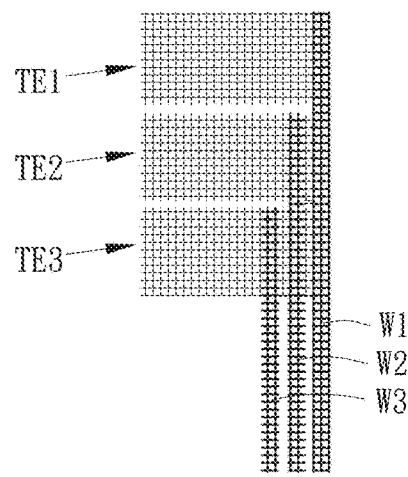
FIG. 9 illustrates a top-view of the touch electrodes and their traces.

Please refer to FIG. 9. FIG. 9 illustrates a top-view of the touch electrodes and their traces. As shown in FIG. 9, the touch electrodes TE1~TE3 and their traces W1~W3 can be disposed on the above-mentioned different conductive layers 321 and 323 respectively and applied to mutual-capacitive touch sensing or self-capacitive touch sensing based on different designs.

Another preferred embodiment of the invention is an in-cell mutual-capacitive touch panel. In this embodiment, the in-cell mutual-capacitive touch panel includes a plurality of pixels. A laminated structure of each pixel includes a substrate, a thin-film transistor layer, a liquid crystal layer, a color filtering layer, and a glass layer.

The thin-film transistor layer is disposed above the substrate. A first conductive layer and a second conductive layer are integrated in the thin-film transistor layer. The liquid crystal layer is disposed above the thin-film transistor layer. The color filtering layer is disposed above the liquid crystal layer. The glass layer is disposed above the color filtering layer. Wherein, the color filtering layer further includes a color filter and a black matrix resist and the black matrix resist has good light resistance, and the first conductive layer and the second conductive layer are disposed under the black matrix resist.

A driving electrode (TX) and a sensing electrode (RX) of the in-cell mutual capacitive touch panel are formed by the first conductive layer in a mesh type. When the driving electrode (TX) and the sensing electrode (RX) formed by the first conductive layer cross each other, the second conductive layer is used as a bridge structure to electrically connect the driving electrode (TX) or electrically connect the sensing electrode (RX). The first conductive layer further includes a first connecting portion separated from the driving electrode (TX) and the sensing electrode (RX), and the first connecting portion is electrically connected with the common electrode. The second conductive layer further includes a second connecting portion electrically connected with the common electrode.

Figure 10:
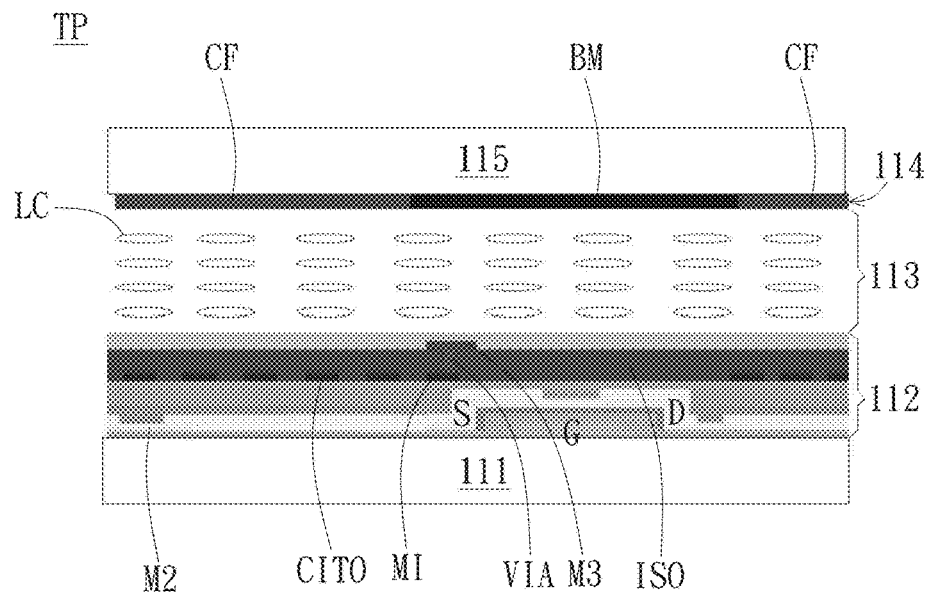
FIG. 10 illustrates a schematic diagram of the laminated structure of the in-cell capacitive touch panel in an embodiment of the invention.

Please refer FIG. 10. FIG. 10 illustrates a schematic diagram of the laminated structure of the in-cell capacitive touch panel in this embodiment. As shown in FIG. 10, the second conductive layer MI and the common electrode CITO are formed at the same time, but the second conductive layer MI and the common electrode CITO are separated from each other. The first conductive layer M3 is formed after the second conductive layer MI and the common electrode CITO. The first conductive layer M3 is disposed above the second conductive layer MI. The first conductive layer M3 is electrically connected with the second conductive layer MI through the via VIA passing through the isolation layer ISO to form a bridge structure. When the driving electrode (TX) and the sensing electrode (RX) formed by the first conductive layer M3 cross each other, the second conductive layer MI is used as a bridge structure to electrically connect with the driving electrode (TX) or electrically connect with the sensing electrode (RX).

Figure 11:
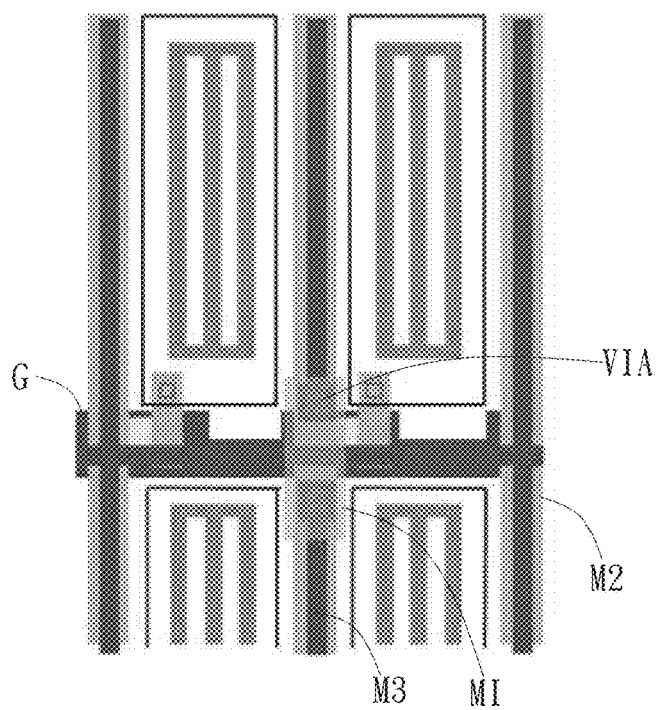
FIG. 11 illustrates a top-view of the pixel design of the first conductive layer and the second conductive layer of FIG. 10 being electrically connected.

Please refer to FIG. 11. FIG. 11 illustrates a top-view of the pixel design of the first conductive layer and the second conductive layer of FIG. 10 being electrically connected. As shown in FIG. 11, the first conductive layer M3 and the second conductive layer MI are electrically connected through the via VIA. It should be noticed that this bridging pixel can appear in each pixel or every multiple pixels (e.g., every three pixels, but not limited to this) without specific limitations.

Figure 12:
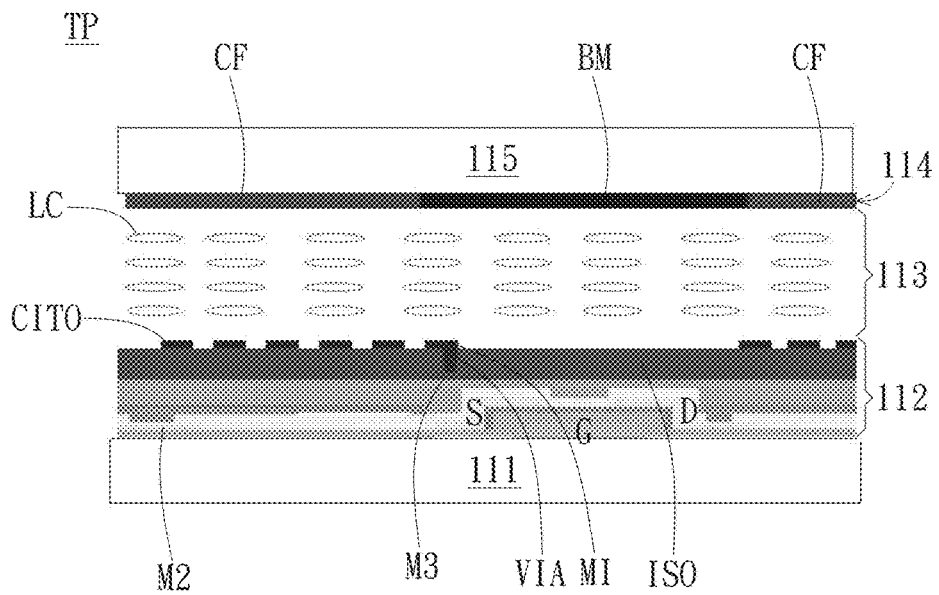
FIG. 12 illustrates a schematic diagram of the laminated structure of the in-cell capacitive touch panel in an embodiment of the invention.

Please refer to FIG. 12. FIG. 12 illustrates a schematic diagram of the laminated structure of the in-cell capacitive touch panel in another embodiment of the invention. As shown in FIG. 12, the second conductive layer MI and the common electrode CITO are formed at the same time, but the second conductive layer MI and the common electrode CITO are separated from each other. The first conductive layer M3 is formed before the second conductive layer MI and the common electrode CITO. The second conductive layer MI is disposed above the first conductive layer M3. The second conductive layer MI is electrically connected with the first conductive layer M3 through the via VIA passing through the isolation layer ISO to form a bridge structure. When the driving electrode (TX) and the sensing electrode (RX) formed by the first conductive layer M3 cross each other, the second conductive layer MI is used as a bridge structure to electrically connect with the driving electrode (TX) or electrically connect with the sensing electrode (RX).

Figure 13:
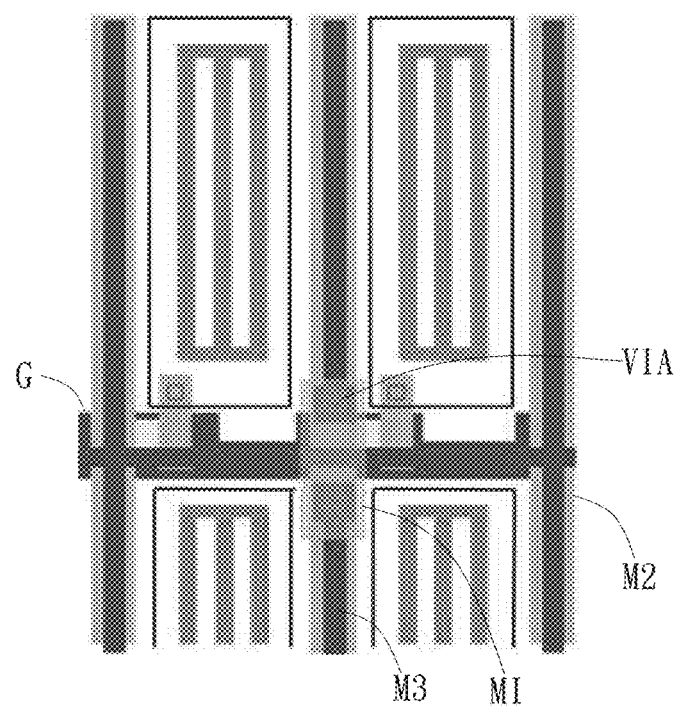
FIG. 13 illustrates a top-view of the pixel design of the first conductive layer and the second conductive layer of FIG. 12 being electrically connected.

Please refer to FIG. 13. FIG. 13 illustrates a top-view of the pixel design of the first conductive layer and the second conductive layer of FIG. 12 being electrically connected. As shown in FIG. 13, the first conductive layer M3 and the second conductive layer MI are electrically connected through the via VIA. It should be noticed that this bridging pixel can appear in each pixel or every multiple pixels (e.g., every three pixels, but not limited to this) without specific limitations.

Figure 14:
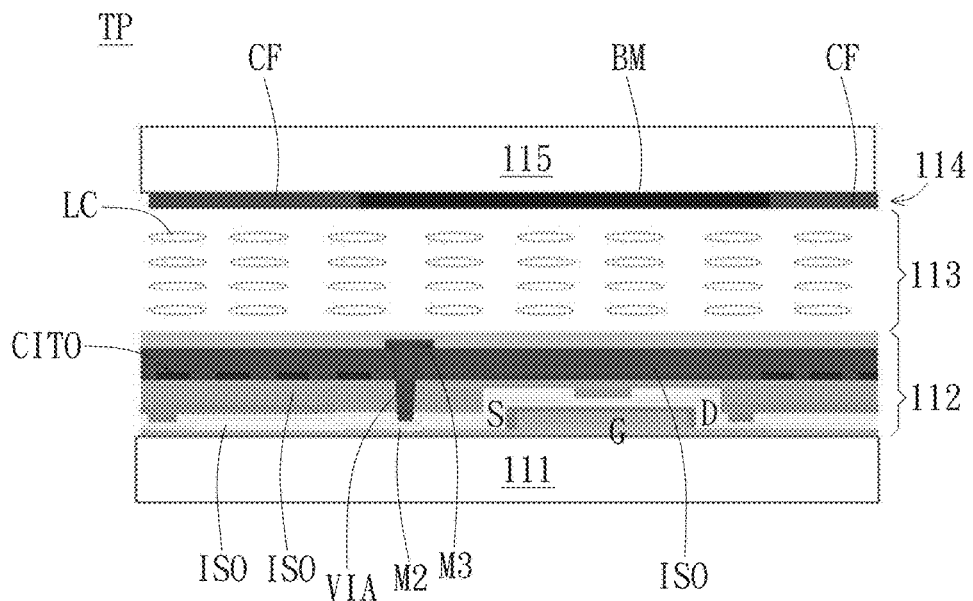
FIG. 14 illustrates a schematic diagram of the laminated structure of the in-cell capacitive touch panel in an embodiment of the invention.

Please refer to FIG. 14. FIG. 14 illustrates a schematic diagram of the laminated structure of the in-cell capacitive touch panel in another embodiment of the invention. As shown in FIG. 14, the second conductive layer M2 is formed before the common electrode CITO and the first conductive layer M3 is formed after the common electrode CITO. It should be noticed that the second conductive layer M2 and a source electrode S and a drain electrode D of the thin-film transistor layer TFT are formed at the same time. The first conductive layer M3 is disposed above the second conductive layer M2. The first conductive layer M3 is electrically connected with the second conductive layer M2 through the via VIA passing through different isolation layers ISO to form a bridge structure. When the driving electrode (TX) and the sensing electrode (RX) formed by the first conductive layer M3 cross each other, the second conductive layer M2 is used as a bridge structure to electrically connect with the driving electrode (TX) or electrically connect with the sensing electrode (RX).

Figure 15:
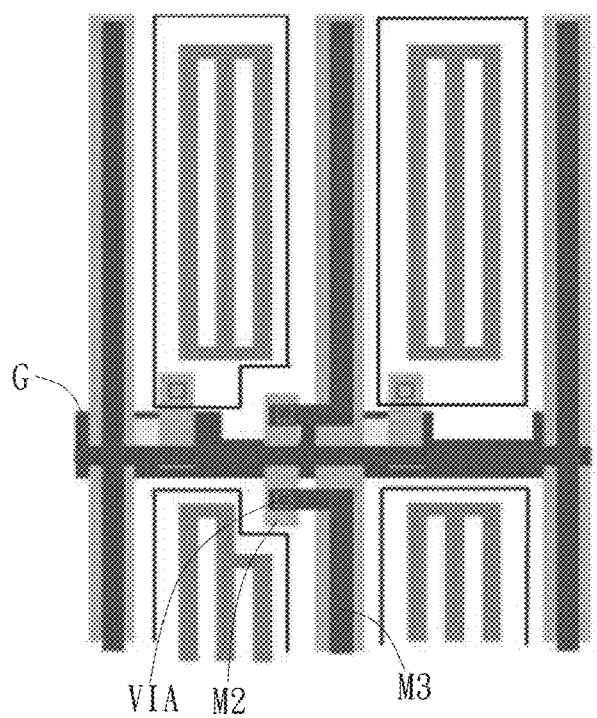
FIG. 15 illustrates a top-view of the pixel design of the first conductive layer and the second conductive layer of FIG. 14 being electrically connected.

Please refer to FIG. 15. FIG. 15 illustrates a top-view of the pixel design of the first conductive layer and the second conductive layer of FIG. 14 being electrically connected. As shown in FIG. 15, the first conductive layer M3 and the second conductive layer M2 are electrically connected through the via VIA. It should be noticed that this bridging pixel can appear in each pixel or every multiple pixels (e.g., every three pixels, but not limited to this) without specific limitations.

Figure 16:
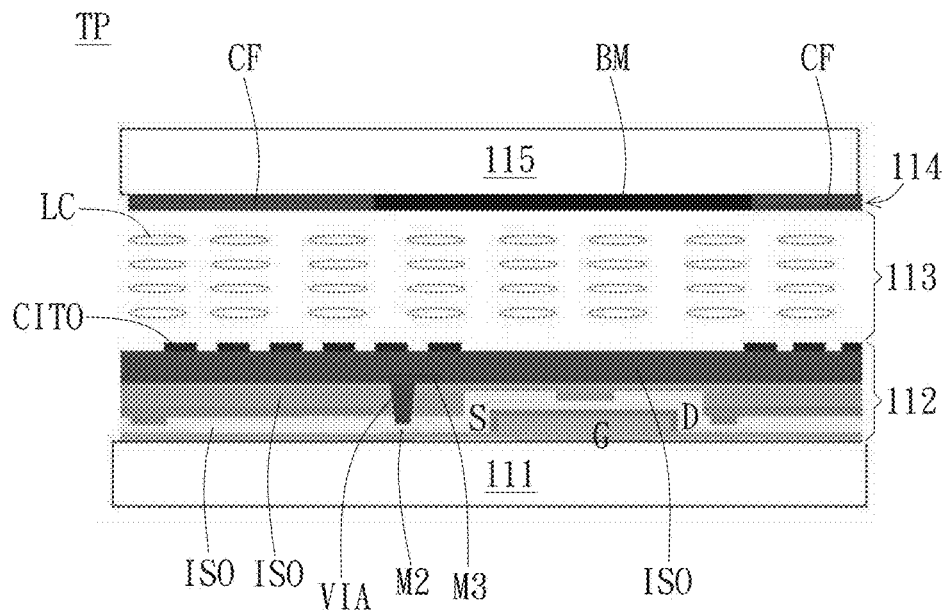
FIG. 16 illustrates a schematic diagram of the laminated structure of the in-cell capacitive touch panel in an embodiment of the invention.

Please refer to FIG. 16. FIG. 16 illustrates a schematic diagram of the laminated structure of the in-cell capacitive touch panel in another embodiment of the invention. As shown in FIG. 16, the second conductive layer M2 is formed before the first conductive layer M3 and the first conductive layer M3 is formed before the common electrode CITO. It should be noticed that the second conductive layer M2 and a source electrode S and a drain electrode D of the thin-film transistor layer TFT are formed at the same time. The first conductive layer M3 is disposed above the second conductive layer M2. The first conductive layer M3 is electrically connected with the second conductive layer M2 through the via VIA passing through different isolation layers ISO to form a bridge structure. When the driving electrode (TX) and the sensing electrode (RX) formed by the first conductive layer M3 cross each other, the second conductive layer M2 is used as a bridge structure to electrically connect with the driving electrode (TX) or electrically connect with the sensing electrode (RX).

Figure 17:
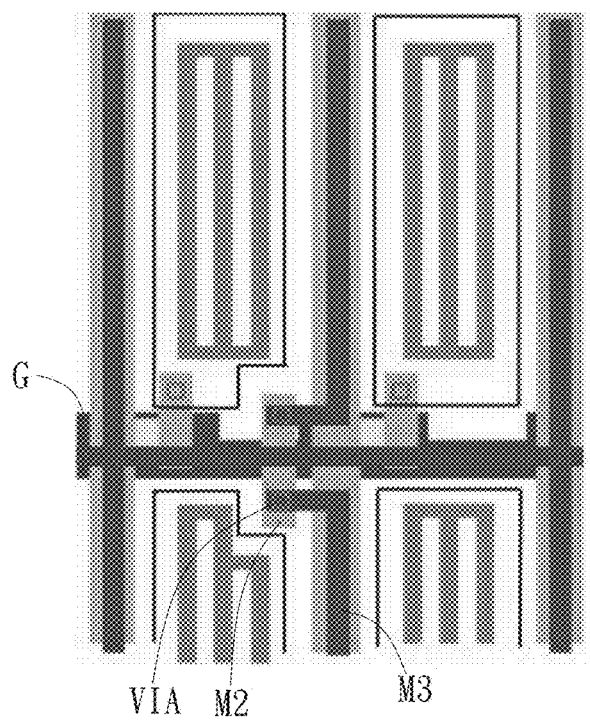
FIG. 17 illustrates a top-view of the pixel design of the first conductive layer and the second conductive layer of FIG. 16 being electrically connected.

Please refer to FIG. 17. FIG. 17 illustrates a top-view of the pixel design of the first conductive layer and the second conductive layer of FIG. 16 being electrically connected. As shown in FIG. 17, the first conductive layer M3 and the second conductive layer M2 are electrically connected through the via VIA. It should be noticed that this bridging pixel can appear in each pixel or every multiple pixels (e.g., every three pixels, but not limited to this) without specific limitations.

Figure 18:
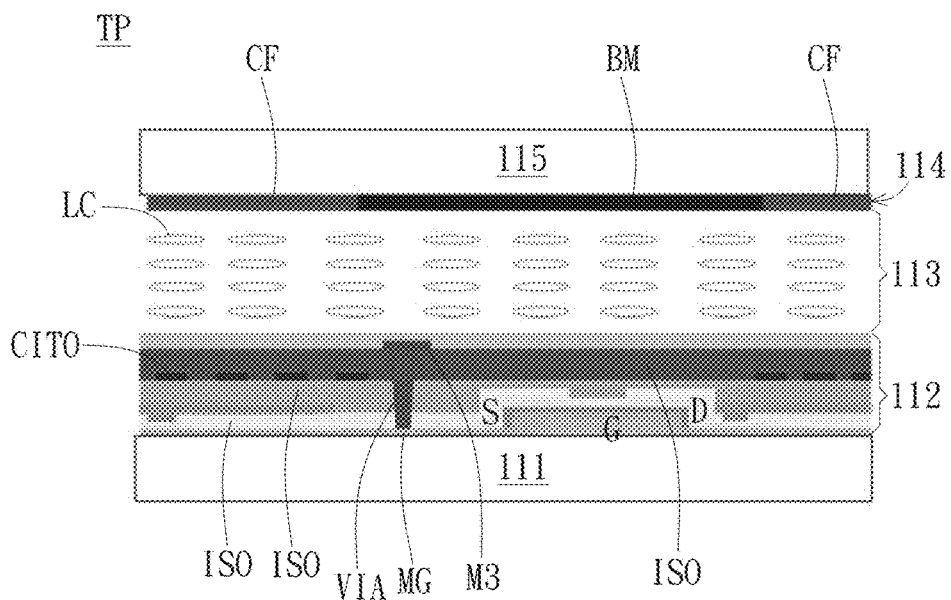
FIG. 18 illustrates a schematic diagram of the laminated structure of the in-cell capacitive touch panel in an embodiment of the invention.

Please refer to FIG. 18. FIG. 18 illustrates a schematic diagram of the laminated structure of the in-cell capacitive touch panel in another embodiment of the invention. As shown in FIG. 18, the second conductive layer MG is formed before the common electrode CITO and the first conductive layer M3 is formed after the common electrode CITO. It should be noticed that the second conductive layer MG and a gate electrode G of the thin-film transistor layer TFT are formed at the same time. The first conductive layer M3 is disposed above the second conductive layer MG. The first conductive layer M3 is electrically connected with the second conductive layer MG through the via VIA passing through different isolation layers ISO to form a bridge structure. When the driving electrode (TX) and the sensing electrode (RX) formed by the first conductive layer M3 cross each other, the second conductive layer MG is used as a bridge structure to electrically connect with the driving electrode (TX) or electrically connect with the sensing electrode (RX).

Figures 19A, 19B:
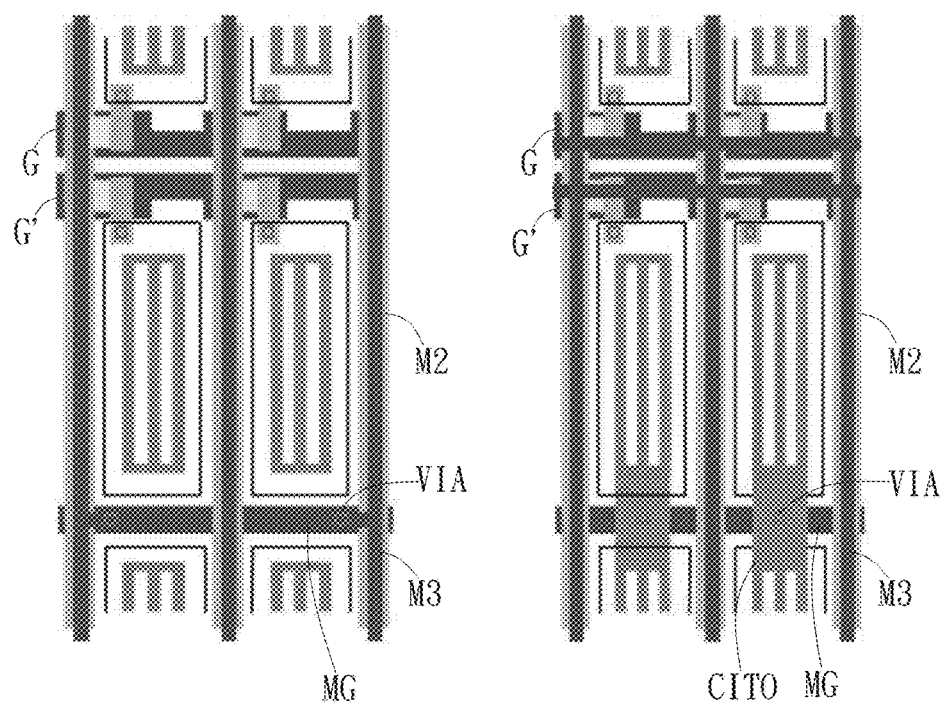
FIG. 19A and FIG. 19B illustrate top-views of the different pixel designs of the first conductive layer and the second conductive layer of FIG. 18 being electrically connected.

Please refer to FIG. 19A and FIG. 19B. FIG. 19A and FIG. 19B illustrate top-views of the different pixel designs of the first conductive layer and the second conductive layer of FIG. 18 being electrically connected. As shown in FIG. 19A and FIG. 19B, the first conductive layer M3 and the second conductive layer MG are electrically connected with the second conductive layer MG through the via VIA. The gate electrode G is arranged adjacent to another gate electrode G' to reduce the necessary width of the black matrix resist BM. This pixel design can make the aperture ratio of the in-cell touch panel become more uniform and enhance the uniformity of the frames displayed by the in-cell touch panel. It should be noticed that this bridging pixel can appear in each pixel or every multiple pixels (e.g., every three pixels, but not limited to this) without specific limitations.

In addition, as shown in FIG. 19B, the second conductive layer MG can be also electrically connected with the common electrode CITO to further decrease the resistance of the common electrode CITO.

Figure 20:
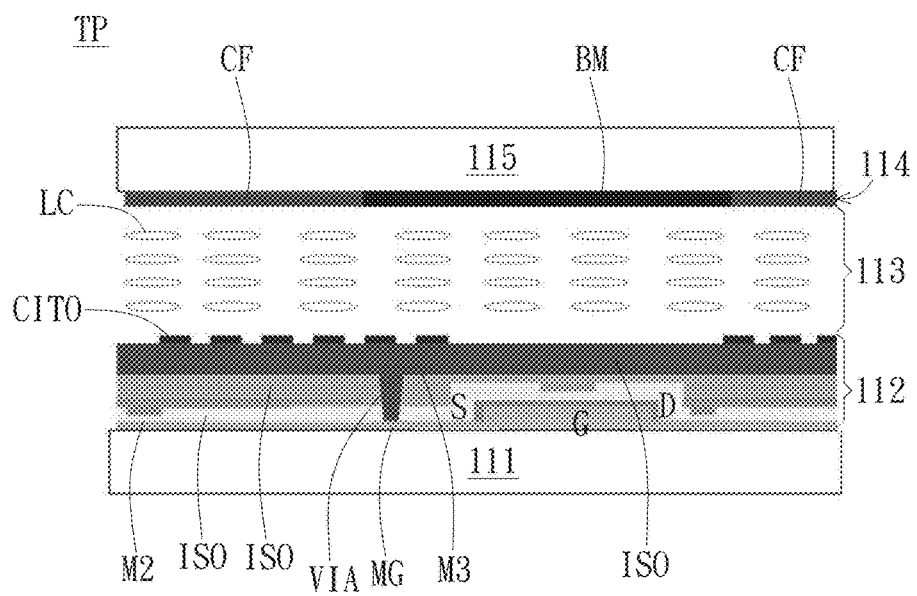
FIG. 20 illustrates a schematic diagram of the laminated structure of the in-cell capacitive touch panel in an embodiment of the invention.

Please refer to FIG. 20. FIG. 20 illustrates a schematic diagram of the laminated structure of the in-cell capacitive touch panel in an embodiment of the invention. As shown in FIG. 20, the second conductive layer MG is formed before the first conductive layer M3 and the first conductive layer M3 is formed before the common electrode CITO. It should be noticed that the second conductive layer MG and a gate electrode G of the thin-film transistor layer TFT are formed at the same time. The first conductive layer M3 is disposed above the second conductive layer MG. The first conductive layer M3 is electrically connected with the second conductive layer MG through the via VIA passing through different isolation layers ISO to form a bridge structure. When the driving electrode (TX) and the sensing electrode (RX) formed by the first conductive layer M3 cross each other, the second conductive layer MG is used as a bridge structure to electrically connect with the driving electrode (TX) or electrically connect with the sensing electrode (RX).

Figures 21A, 21B:
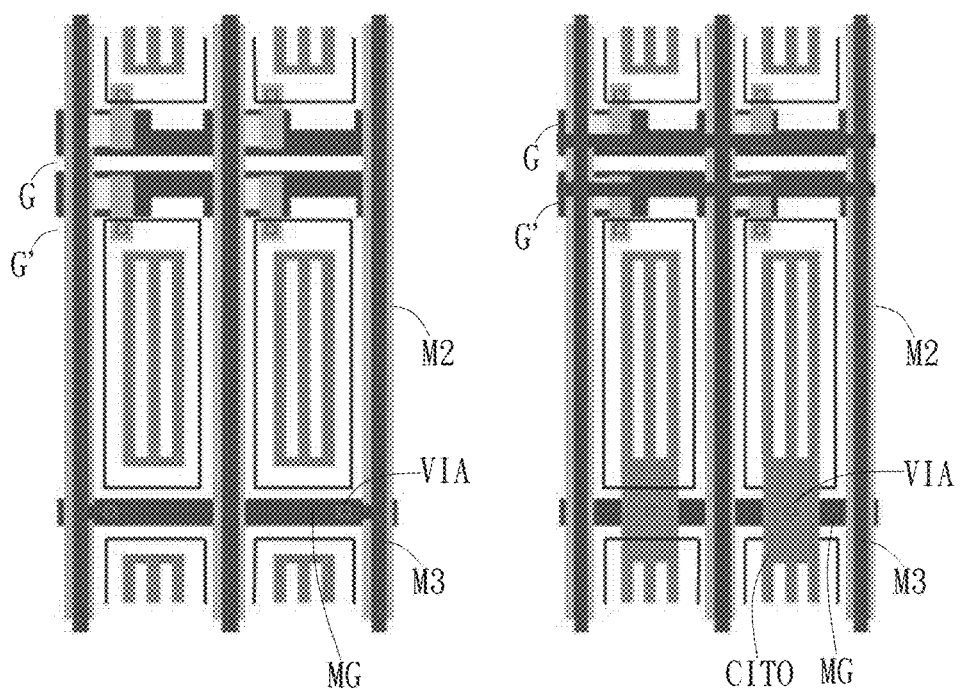
FIG. 21A and FIG. 21B illustrate top-views of the different pixel designs of the first conductive layer and the second conductive layer of FIG. 20 being electrically connected.

Please refer to FIG. 21A and FIG. 21B. FIG. 21A and FIG. 21B illustrate top-views of the different pixel designs of the first conductive layer and the second conductive layer of FIG. 20 being electrically connected. As shown in FIG. 21A and FIG. 21B, the first conductive layer M3 and the second conductive layer MG are electrically connected with the second conductive layer MG through the via VIA. The gate electrode G is arranged adjacent to another gate electrode G' to reduce the necessary width of the black matrix resist BM. This pixel design can make the aperture ratio of the in-cell touch panel become more uniform and enhance the uniformity of the frames displayed by the in-cell touch panel. It should be noticed that this bridging pixel can appear in each pixel or every multiple pixels (e.g., every three pixels, but not limited to this) without specific limitations.

In addition, as shown in FIG. 21B, the second conductive layer MG can be also electrically connected with the common electrode CITO to further decrease the resistance of the common electrode CITO.

Figure 22:
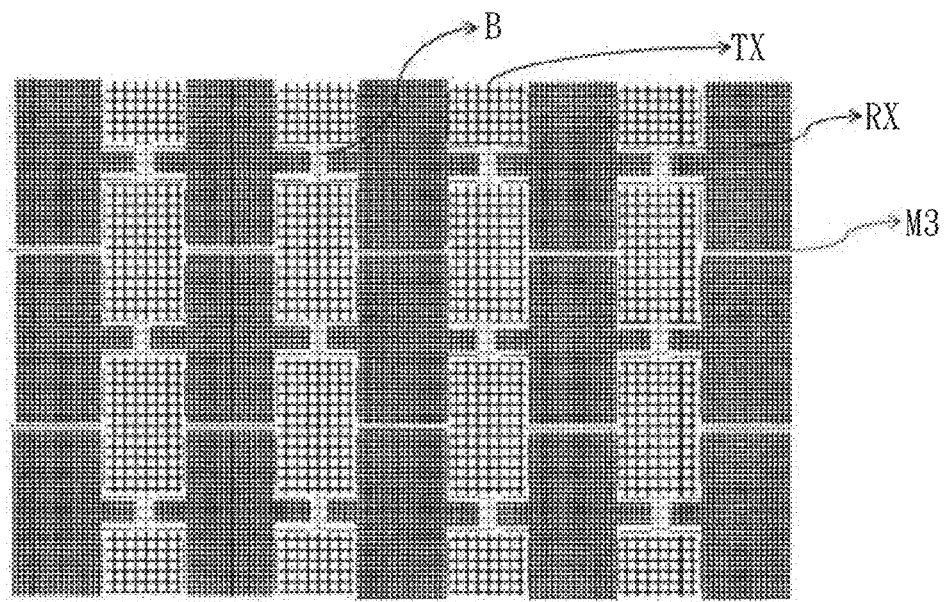
FIG. 22 illustrates a schematic diagram of the touch electrode design of the in-cell mutual-capacitive touch panel.

Please refer to FIG. 22. FIG. 22 illustrates a schematic diagram of the touch electrode design of the in-cell mutual-capacitive touch panel. As shown in FIG. 22, the touch electrodes of the in-cell mutual-capacitive touch panel include at least one first direction touch electrode and at least one second direction touch electrode. The first direction touch electrode and the second direction touch electrode can be a driving electrode TX and a sensing electrode RX respectively. In practical applications, the touch electrodes can be formed by metal material or any other materials.

It should be noticed that the driving electrode TX and the sensing electrode RX are both formed by the first conductive layer M3 in mesh type. When the driving electrode TX and the sensing electrode RX formed by the first conductive layer M3 cross each other, cross-layer electrical connection of the driving electrode TX or the sensing electrode RX can be formed through the bridge structure of the second conductive layer (M2, MI, or MG). In addition, the first conductive layer M3 can be also suitably disposed at vacancies between the touch electrodes and electrically connected with the common electrode CITO to decrease the resistance of the common electrode CITO.

Figure 23A:
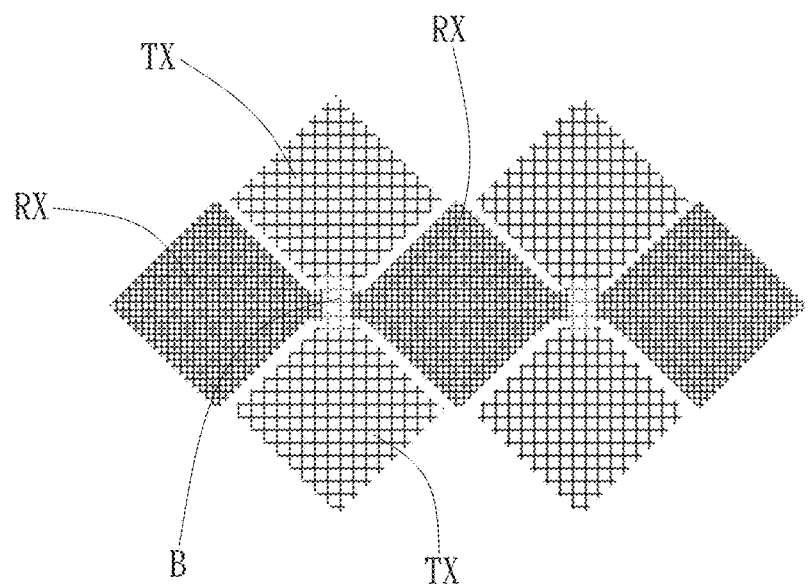
FIG. 23A, FIG. 23B, and FIG. 23C illustrate schematic diagrams of different shapes of the driving electrodes and the sensing electrodes formed by the first conductive layer in a mesh type respectively.
Figure 23B:
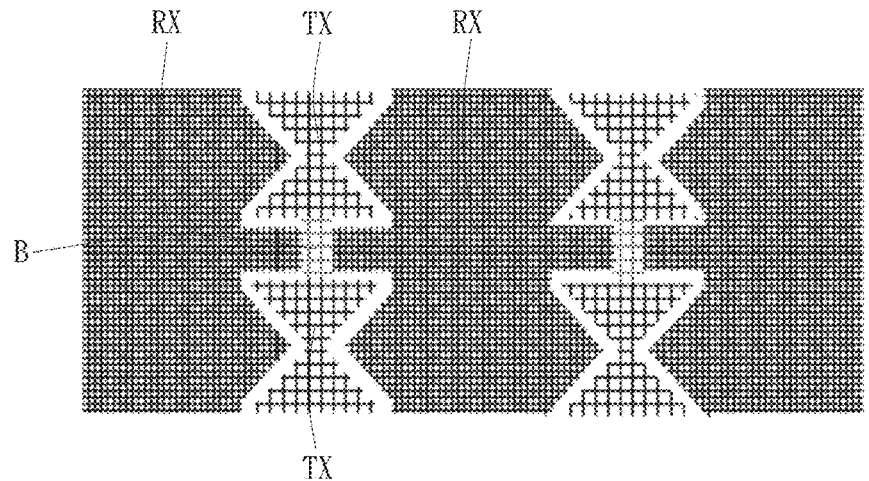
Figure 23C:
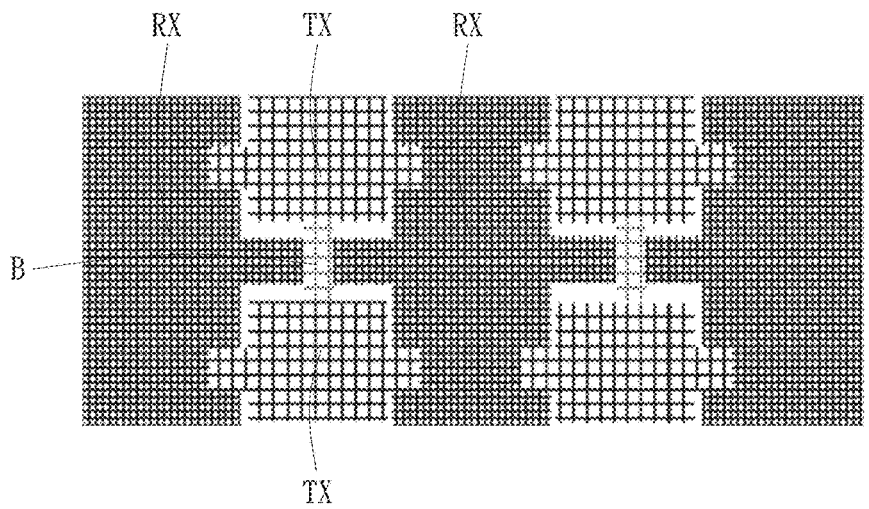

Please refer to FIG. 23A, FIG. 23B, and FIG. 23C. The driving electrodes and the sensing electrodes formed by the first conductive layer in a mesh type can be rectangle, or various shapes shown in FIG. 23A, FIG. 23B, or FIG. 23C, but not limited to these cases.

Figure 24:
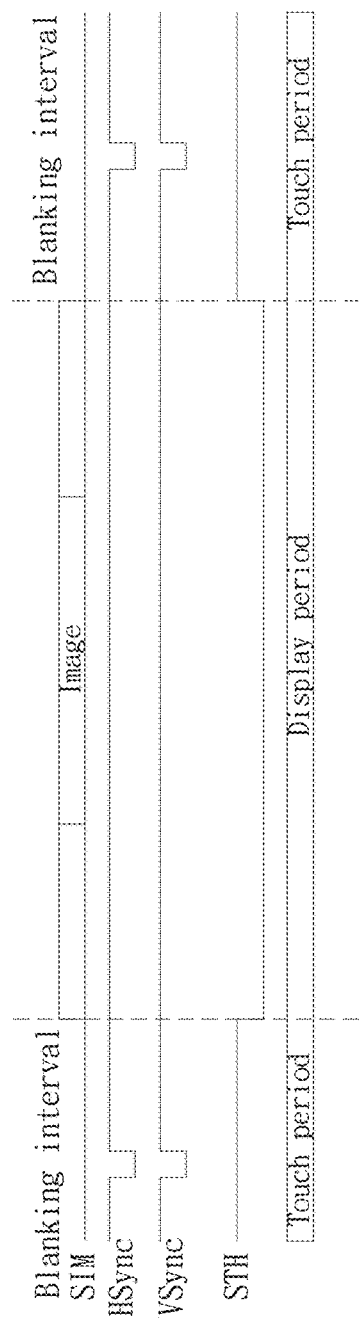
FIG. 24 illustrates a timing diagram of the touch mode and the display mode of the in-cell mutual-capacitive touch panel being driven in a time-sharing way.

Please refer to FIG. 24. FIG. 24 illustrates a timing diagram of the touch mode and the display mode of the in-cell mutual-capacitive touch panel being driven in a time-sharing way. As shown in FIG. 24, the in-cell mutual-capacitive touch panel can be operated in the touch mode or the display mode at different times; that is to say, the touch mode and the display mode of the in-cell mutual-capacitive touch panel are driven in the time-sharing way. It should be noticed that the in-cell mutual-capacitive touch panel operated in the touch mode will output a touch driving signal STH during a blanking interval in the image signal SIM. The in-cell mutual-capacitive touch panel will perform touch sensing during non-display timing (namely the blanking interval).

Figure 25:
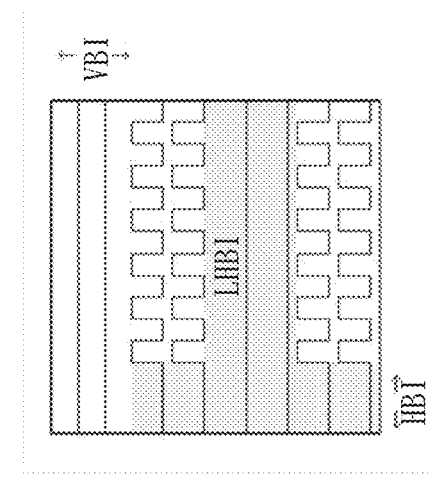
FIG. 25 illustrates a schematic diagram of the vertical blanking interval (VBI), the horizontal blanking interval (HBI), and the long horizontal blanking interval respectively.

In practical applications, the in-cell mutual-capacitive touch panel can use one or more kinds of blanking intervals based on different driving ways. As shown in FIG. 25, the blanking intervals can include at least one of the vertical blanking interval VBI, the horizontal blanking interval HBI, and the long horizontal blanking interval LHBI. Wherein, the time length of the long horizontal blanking interval LHBI is equal to or larger than that of the horizontal blanking interval HBI. The long horizontal blanking interval LHBI can be obtained by redistributing a plurality of horizontal blanking intervals HBI or the long horizontal blanking interval LHBI includes the vertical blanking interval VBI.

When the in-cell mutual-capacitive touch panel is operated in the touch mode, the common electrodes can be switched to a floating state at the same time or a touch related signal can be provided to the common electrodes at the same time to reduce the parasitic capacitance of the in-cell mutual-capacitive touch panel.

Figure 26A:
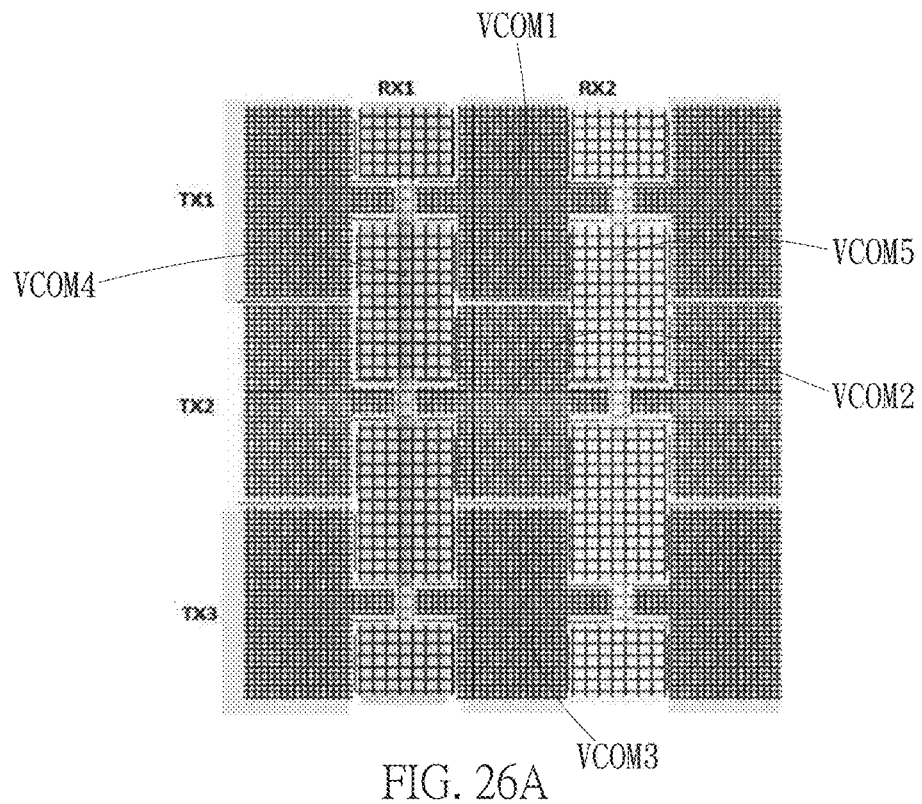
FIG. 26A and FIG. 26B illustrate a schematic diagram of the in-cell mutual-capacitive touch panel having multiple common electrode regions and a timing diagram of the signals when the in-cell mutual-capacitive touch panel is operated in the touch mode or the display mode.

Please refer to FIG. 26A. In an embodiment, the common electrode can be disconnected at suitable positions to form multiple common electrode regions VCOM1~VCOM5. When the in-cell mutual-capacitive touch panel is operated in the touch mode, different signals will be provided to the different common electrode regions VCOM1~VCOM5. Wherein, the common electrode regions VCOM1~VCOM3 overlap the driving electrodes TX1~TX3; the common electrode regions VCOM4~VCOM5 overlap the sensing electrodes RX1~RX2.

Figure 26B:
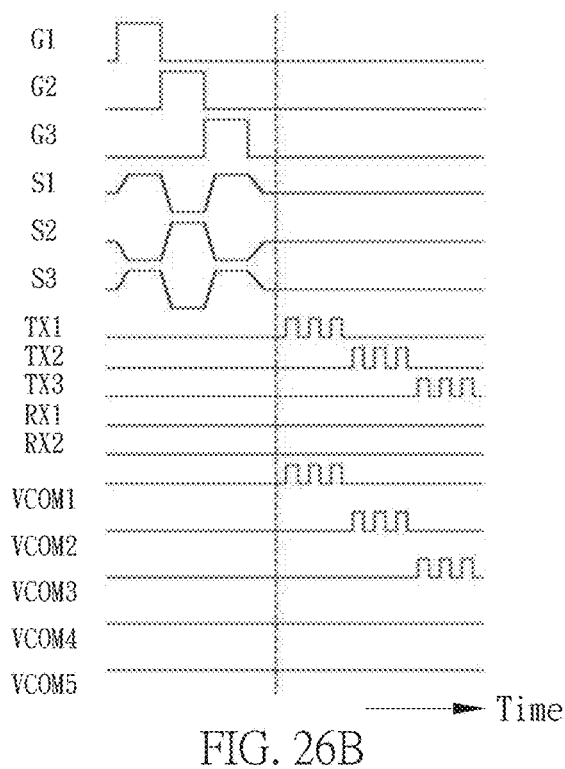

Please also refer to FIG. 26B. FIG. 26B illustrate a timing diagram of the signals when the in-cell mutual-capacitive touch panel is operated in the touch mode or the display mode. As shown in FIG. 26B, when the in-cell mutual-capacitive touch panel is operated in the display mode, the gate drivers and source drivers will output gate driving signals G1~G3 and source driving signals S1~S3 respectively to drive the pixels of the in-cell mutual-capacitive touch panel to display images; when the in-cell mutual-capacitive touch panel is operated in the touch mode, touch-related driving signals will be provided to the common electrode regions VCOM1~VCOM3 overlapping the driving electrodes TX1~TX3 respectively and the common electrode regions VCOM4~VCOM5 overlapping the sensing electrodes RX1~RX2 will be maintained at a fixed voltage.

Figure 27A:
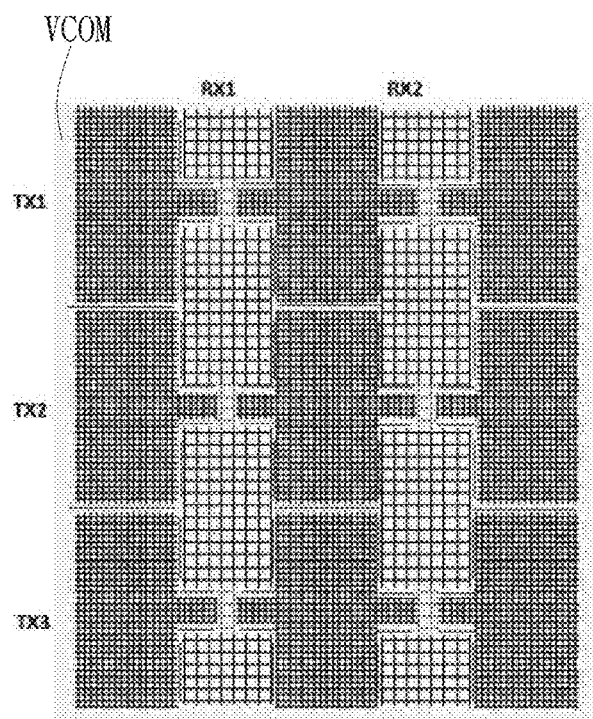
FIG. 27A and FIG. 27B illustrate a schematic diagram of the in-cell mutual-capacitive touch panel having single common electrode region and a timing diagram of the signals when the in-cell mutual-capacitive touch panel is operated in the touch mode or the display mode.

Please refer to FIG. 27A. In another embodiment, the common electrode can have single common electrode region VCOM overlapping the driving electrodes TX1~TX3 and the sensing electrodes RX1~RX2.

Figure 27B:
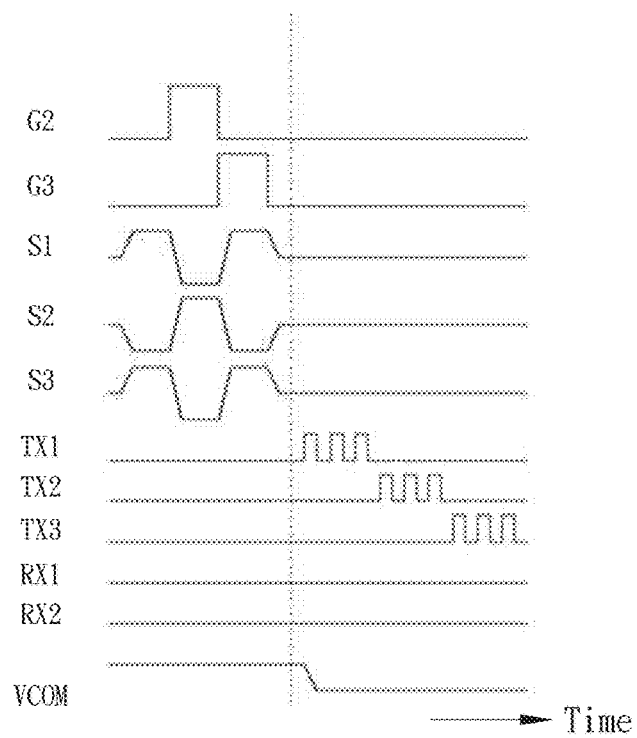

Please also refer to FIG. 27B. FIG. 27B illustrates a timing diagram of the signals when the in-cell mutual-capacitive touch panel is operated in the touch mode or the display mode. As shown in FIG. 27B, when the in-cell mutual-capacitive touch panel is operated in the display mode, the gate drivers and source drivers will output gate driving signals G1~G3 and source driving signals S1~S3 respectively to drive the pixels of the in-cell mutual-capacitive touch panel to display images; when the in-cell mutual-capacitive touch panel is operated in the touch mode, the common electrode region VCOM will be switched to a floating voltage level VF.

Compared to the prior arts, the in-cell mutual-capacitive touch panel and its trace layout of the invention have following advantages:
(1) Designs of the touch electrodes and their traces in the in-cell touch panel of the invention are very simple, and the cost of the in-cell touch panel of the invention can be reduced.
(2) Optical effects on the LCD touch panel can be reduced by the novel trace layout method of the invention, and the aperture ratio of the LCD touch panel can be enhanced.
(3) The RC loading of the common electrode can be reduced by electrically connecting the non-touch electrode part of the first conductive layer and the second conductive layer with the common electrode.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

The invention claimed is:

1. An in-cell touch panel, comprising:
   a plurality of pixels, a laminated structure of each pixel comprising:
   a substrate;
   a thin-film transistor layer disposed above the substrate, a first conductive layer and a second conductive layer being integrated in the thin-film transistor layer;
   a liquid crystal layer, disposed above the thin-film transistor layer;
   a color filtering layer, disposed above the liquid crystal layer; and
   a glass layer, disposed above the color filtering layer;
   wherein the second conductive layer and a common electrode are formed simultaneously, but the second conductive layer and the common electrode are separated, and the first conductive layer is formed before the common electrode, the second conductive layer is formed above the first conductive layer and the second conductive layer is electrically connected with the first conductive layer to form a bridge structure.

2. The in-cell touch panel of claim 1, wherein the second conductive layer and a source electrode and a drain electrode of the thin-film transistor layer are formed simultaneously.

3. The in-cell touch panel of claim 1, wherein the second conductive layer and a gate electrode of the thin-film transistor layer are formed simultaneously.

4. The in-cell touch panel of claim 3, wherein the gate electrode of the thin-film transistor layer is arranged adjacent to another gate electrode.

5. The in-cell touch panel of claim 1, wherein the in-cell touch panel is an in-cell mutual capacitive touch panel and a driving electrode (TX) and a sensing electrode (RX) of the in-cell mutual capacitive touch panel are formed by the first conductive layer in a mesh type.

6. The in-cell touch panel of claim 5, wherein when the driving electrode (TX) and the sensing electrode (RX) formed by the first conductive layer cross each other, the second conductive layer is used as a bridge structure to electrically connect the driving electrode (TX) or electrically connect the sensing electrode (RX).

7. The in-cell touch panel of claim 5, wherein the first conductive layer further comprises a first connecting portion separated from the driving electrode (TX) and the sensing electrode (RX), and the first connecting portion is electrically connected with the common electrode.

8. The in-cell touch panel of claim 1, wherein the second conductive layer further comprises a second connecting portion electrically connected with the common electrode.

9. The in-cell touch panel of claim 1, wherein the color filtering layer further comprises a color filter and a black matrix resist and the black matrix resist has good light resistance, and the first conductive layer and the second conductive layer are disposed under the black matrix resist.

10. The in-cell touch panel of claim 1, wherein when the in-cell touch panel is operated in a touch mode, the common electrode is switched to a floating voltage level or provided a touch-related signal.

11. The in-cell touch panel of claim 1, wherein a touch mode and a display mode of the in-cell touch panel are driven in a time-sharing way, and the in-cell touch panel is operated in the touch mode during a blanking interval of a display period of the in-cell touch panel.

12. The in-cell touch panel of claim 11, wherein the blanking interval comprises at least one of a vertical blanking interval (VBI), a horizontal blanking interval (HBI), and a long horizontal blanking interval, the long horizontal blanking interval has a time length equal to or larger than that of the horizontal blanking interval, the long horizontal blanking interval is obtained by redistributing a plurality of the horizontal blanking interval or the long horizontal blanking interval comprises the vertical blanking interval.

13. An in-cell touch panel, comprising:
a plurality of pixels, a laminated structure of each pixel comprising:
    a substrate;
    a thin-film transistor layer disposed above the substrate, a first conductive layer and a second conductive layer being integrated in the thin-film transistor layer;
    a liquid crystal layer, disposed above the thin-film transistor layer;
    a color filtering layer, disposed above the liquid crystal layer; and
    a glass layer, disposed above the color filtering layer;
    wherein the in-cell touch panel is an in-cell mutual capacitive touch panel and a driving electrode (TX) and a sensing electrode (RX) of the in-cell mutual capacitive touch panel are formed by the first conductive layer in a mesh type.

14. An in-cell touch panel, comprising:
a plurality of pixels, a laminated structure of each pixel comprising:
    a substrate;
    a thin-film transistor layer disposed above the substrate, a first conductive layer and a second conductive layer being integrated in the thin-film transistor layer;
    a liquid crystal layer, disposed above the thin-film transistor layer;
    a color filtering layer, disposed above the liquid crystal layer; and
    a glass layer, disposed above the color filtering layer;
    wherein when the in-cell touch panel is operated in a touch mode, a common electrode is switched to a floating voltage level without being used as a touch electrode.

* * * * *